INCREASED GAIN BROAD-BAND TELEVISION ANTENNA

Filed Sept. 30, 1965 3 Sheets-Sheet 1

INVENTOR.
SYLVAN SIMONS
BY Alfred E. Miller
ATTORNEY

INCREASED GAIN BROAD-BAND TELEVISION ANTENNA

Filed Sept. 30, 1965 3 Sheets-Sheet 2

INVENTOR.
SYLVAN SIMONS

BY Alfred E. Miller

ATTORNEY

Oct. 7, 1969 S. SIMONS 3,471,859

INCREASED GAIN BROAD-BAND TELEVISION ANTENNA

Filed Sept. 30, 1965 3 Sheets-Sheet 3

INVENTOR.
SYLVAN SIMONS

BY Alfred E. Miller

ATTORNEY

United States Patent Office
3,471,859
Patented Oct. 7, 1969

3,471,859

INCREASED GAIN BROAD-BAND TELEVISION ANTENNA

Sylvan Simons, 242 Madison Ave., Port Chester, N.Y. 10574

Filed Sept. 30, 1965, Ser. No. 491,639
Int. Cl. H01q 21/12
U.S. Cl. 343—815 4 Claims

ABSTRACT OF THE DISCLOSURE

A broad-band television antenna having an increased gain and provided with paired, horizontal conductors and preferably three groups of parasitic elements. One of the groups has parasitic elements that are mounted at a downward angle relative to the horizontal conductors and out of the plane of said conductors.

The present invention relates to broad-band television antennas and especially to television antennas utilizing bent parasitic directors and to a combination UHF–VHF television antenna incorporating the present unique director arrangement as well as to a Yagi array using parasitic directors of the aforementioned type.

A constant problem in designing television antennas has been to increase their gain. It is well known to use parasitic director elements to increase antenna gain but the amount of gain that may be obtained with a plurality of directors is limited by the capture area or aperture, since only a given amount of energy may be extracted from a limited aperture. Previously known antennas utilized crossed parasitic elements to increase the capture area. However, these elements were suitable only as reflectors and not directors because of their low Q.

It is a principal object of the present invention to increase the gain of a broad-band television antenna by increasing the aperture or capture area by the use of parasitic directors bent away from the plane of the antenna. The foregoing arrangement may be incorporated with the so-called Yagi antennas as well as with combination UHF–VHF television antennas.

Another object of the present invention is to provide a combination UHF-VHF television antenna that is relatively easy and fast to assemble and install, and has a satisfactory gain on both the UHF and VHF television channels.

The above and other features, objects and advantages of the present invention will be fully understood from the following description considered in conection with the accompanying illustrative drawings.

Figures 1, 4, 7:
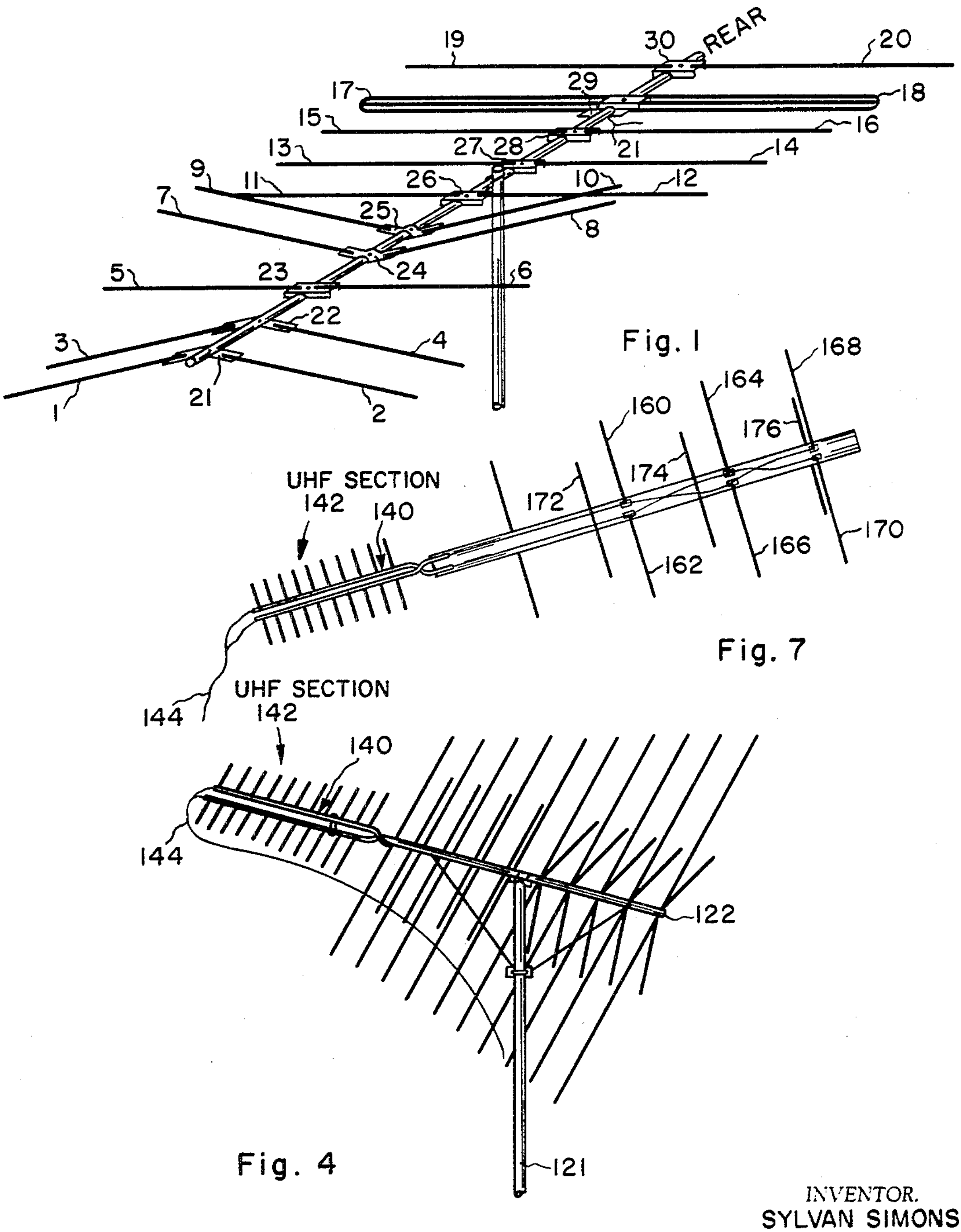
FIG. 1 is a perspective view of a Yagi antenna array having a director arrangement in front thereof constructed in accordance with the teachings of the present invention.
FIG. 3 is a front elevation view of one pair of conductors and associated parasitic directors constructed in accordance with the teachings of the present invention and FIG. 4 is a perspective upward view of a combination UFH-VHF television antenna with the aforesaid bent parasitic directors.
FIG. 7 is a top plan view of an alternate embodiment of the present combination UHF and VHF television antenna.

Referring to the drawings and especially to FIG. 1 in which is illustrated a five-element Yagi-type television antenna array comprising director elements 11, 12, 13, 14, 15 and 16 as well as folded dipole 17 and 18. Elements 19 and 20 are parasitic reflectors. Metallic brackets 26, 27 and 28 connect adjacent director elements 11 and 12, 13 and 14; 15 and 16; respectively. Metallic bracket 30 connects reflector elements 19 and 20. A lead-in wire 21 is shown connected to the folded dipole 17–18.

Mounted forward of the Yagi array is an arrangement comprising downwardly inclined director pairs 1, 2 and 3, 4 and upwardly inclined director pairs 7, 8 and 9, 10. The directors 1–4 are inclined downwardly up to 30° relative to straight parasitic director elements 5, 6 and preferably 12°. The directors 7–10 are similarly inclined but upwardly, and preferably in the order of 12° relative to director, 5, 6. Metallic brackets 21 and 22 connect directors 1, 2 and 3, 4 respectively while metallic brackets 24 and 25 connect directors 7, 8 and 9, 10 respectively. The directors 7–10 together with their metallic joining brackets constitute two parasitic directors bent to increase the aperture or capture area in the upward direction while the directors 1–4 together with their metallic joining brackets comprise two parasitic directors bent to increase the capture area in the downward direction. Conductors 5 and 6 together with metallic bracket 23 constitutes a straigth parasitic director to intercept and reradiate the radiation from directors comprising elements 1–4. Thus, the straight director 5, 6 intercepts the radiated signal from directors constituted of conductors 1, 2 and 3, 4 and reorients the signal.

A television antenna constructed to receive channel 7 with maximum gain has the following dimensions:

| | Inches |
|---|---|
| Reflector **19, 20** | 16½ |
| Dipole **17, 18** | 15 |
| Director **15, 16** | 14½ |
| Director **13, 14** | 13½ |
| Director **11, 12** | 13½ |
| Straight director **5, 6** | 13 |
| Bent director **1, 2** | 15 |
| Bent director **3, 4** | 15 |
| Bent director **7, 8** | 15 |
| Bent director **9, 10** | 15 |
| Dipole **17, 18** to reflector **19, 20** spacing | 12 |
| Dipole **17, 18** to first director **15, 16** | 9 |
| Distance between all other directors | 6 |

Figure 2:
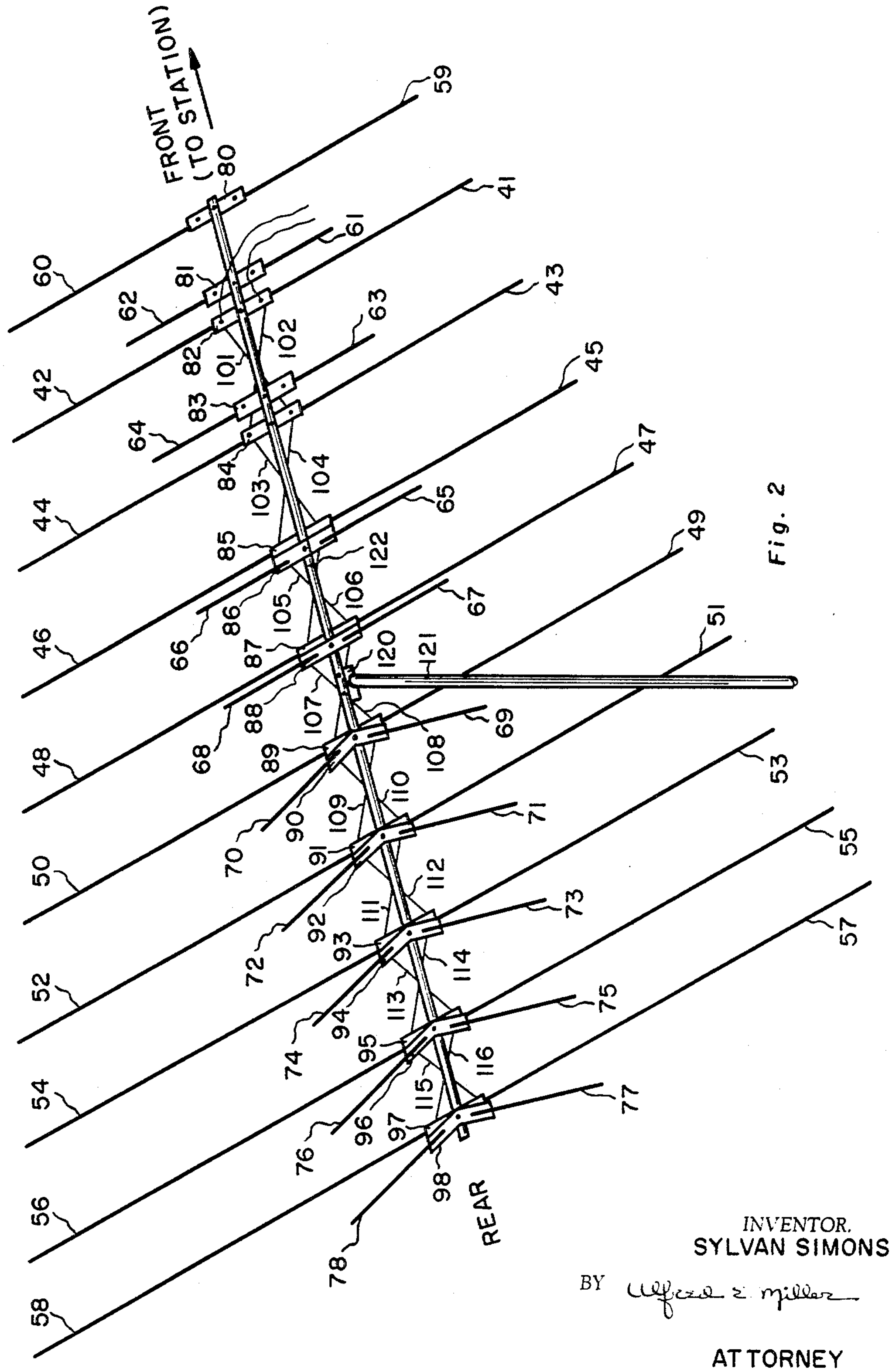
FIG. 2 is a perspective view of a cross-connected VHF antenna having straight line conductors with straight line parasitic conductors forward and a series of bent parasitic directors in the rear thereof.

FIG. 2 illustrates an all-wave television antenna for the VHF band having paired conductors 41, 42; 43, 44; 45, 46; 47, 48; 49, 50; 51, 52; 53, 54; 55, 56 and 57, 58 which form a cross-connected, staggered tuned antenna. Conductors 41 and 42 supported by insulating bracket 82 are manufactured of such a length to operate as an approximately full wavelength dipole at the highest television channel to be received by the antenna. Connectors 101 and 102 cross-connect conductors 41 and 42 to rearward conductors 43 and 44 which are supported by insulating bracket 84. Conductors 43 and 44 are made slightly longer than conductors 41 and 42 in order to give maximum response to a lower frequency channel than conductors 41 and 42 are tuned to, and, additionally, to add directivity to the array. It should also be noted that conductors 41 and 42 as well as conductors 43 and 44 are no more than double the length of their associated parasitic elements. To the rear conductors 43, 44 are conductors 45 and 46 which are fabricated of a length to operate at the highest channel in the low TV band, and are connected to conductors 43, 44 by cross-connectors 103 and 104. The remaining conductors 47, 48; 49, 50; 51, 52; 53, 54; 55, 56; and 57, 58 are connected in pairs by means of insulating brackets 85, 87, 89, 91, 93, 95 and 97 respectively. In addition, said remaining conductors are cross-connected to both their front and rear conductors by cross-connectors 107, 108; 109, 110; 111, 112; 113, 114; and 115, 116 respectively. The length of each of the conductor pairs increases as they are located further to the rear of said antenna array in order to increase the directivity and broad band response of the antenna. The length of the most rearward conductor pair of elements 57 and 58 is chosen to give the maximum response on television channel 2, the lowest frequency to which the antenna is constructed to respond.

Parasitic director elements 59 and 60 are electrically connected by metallic bracket 80.

Parasitic director elements constituted of conductors 61 and 62 electrically connected by metallic bracket 81 and director elements 63 and 64 electrically connected by metallic bracket 83 reinforce the signal on the high VHF television band. Director elements 61, 62 and 63, 64 are mounted forward of their respective conductors 41, 42 and 43, 44. The two pairs of parasitic elements composed of conductors 65, 66, 67 and 68 are mounted underneath their respective parent elements, conductors 45, 46 and 47, 48 for the highest gain, and they have the proper length to operate in the high VHF television band.

Bent parasitic elements 69, 70; 71, 72; 73, 74; 75, 76; and 77, 78 each have a length which is adjusted to operate in the high TV band to increase the aperture or capture area of the antenna and therefore increase the pick up in the television high band. Each pair of bent parasitic elements are mounted below their associated conductors 49–58 respectively at an angle up to 30° relative thereto, but preferably at 12° (see FIG. 3). Metallic brackets 90, 92, 94, 96 and 98 connect and support the aforementioned conductors.

The entire antenna array is mounted on a support boom 122 which is in turn secured to antenna mast 121 by means of clamp 120.

Figure 3:
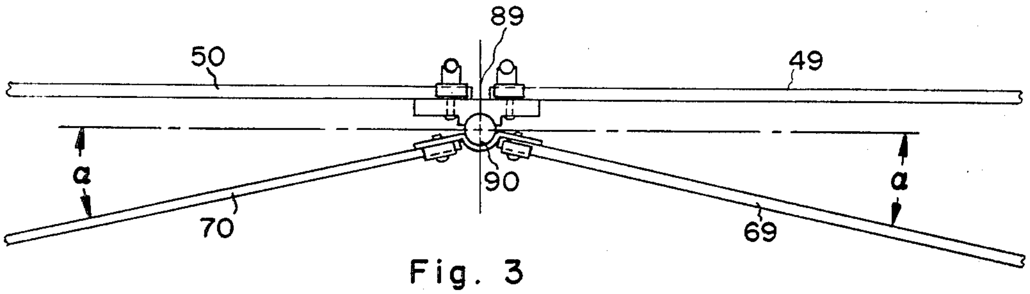

FIG. 3 illustrates one of the pairs of conductors 49, 50 with its parasitic elements 69, 70 together with metallic bracket 90 and insulating bracket 89. The angle as well as the placement of the parasitic directors 69, 70 is clearly shown.

A television antenna constructed in accordance with FIGS. 2 and 3 has the following dimensions:

| | Inches |
|---|---|
| Directors 59 and 60 | 21 |
| Directors 61 and 62 | 11½ |
| Directors 63 and 64 | 12½ |
| Conductors 41 and 42 | 23 |
| Conductors 43 and 44 | 25 |
| Conductors 45 and 46 | 30 |
| Conductors 47 and 48 | 33 |
| Conductors 49 and 50 | 39 |
| Conductors 51 and 52 | 42 |
| Conductors 53 and 54 | 44 |
| Conductors 55 and 56 | 47 |
| Conductors 57 and 58 | 49 |
| Parasitic elements 65 and 66 | 13½ |
| Parasitic elements 67 and 68 | 14 |
| Bent directors 69 and 70 | 15 |
| Bent directors 71 and 72 | 15 |
| Bent directors 73 and 74 | 16 |
| Bent directors 75 and 76 | 16 |
| Bent directors 77 and 78 | 16 |
| Distance from directors 59 and 60 to directors 61 and 62 | 5¾ |
| Distance from directors 61 and 62 to conductors 41 and 42 | 3 |
| Distance from conductors 41 and 42 to directors 63 and 64 | 9 |
| Distance from directors 63 and 64 to conductors 43 and 44 | 3 |
| Distance from conductors 45 and 46 to conductors 47 and 48; from conductors 47 and 48 to conductors 49 and 50; from conductors 49 and 50 to conductors 51 and 52; from conductors 51 and 52 to conductors 53 and 54; from conductors 53 and 54 to conductors 55 and 56; from conductors 55 and 56 to conductors 57 and 58 | 12 |

Figures 5, 6:
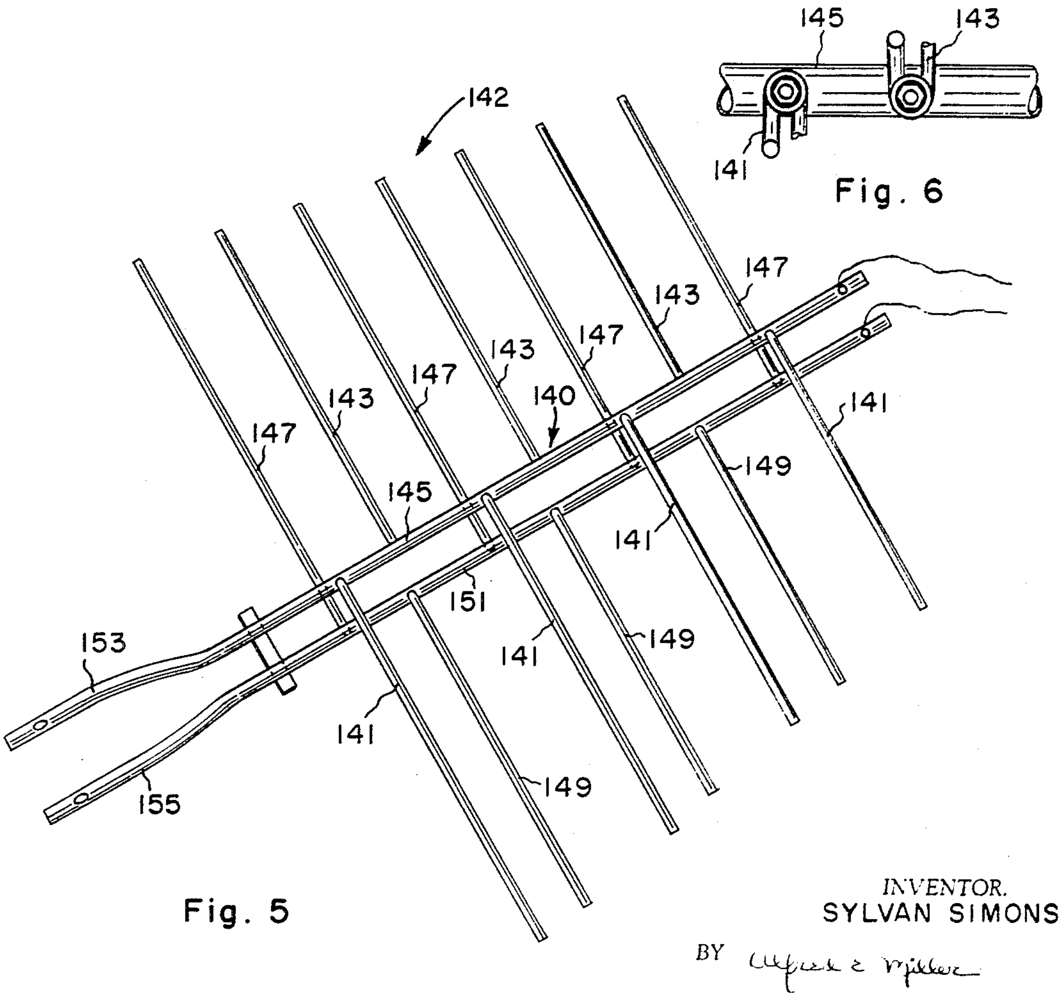
FIG. 5 is a top plan view of the UHF section of the television antenna.
FIG. 6 is a fragmentary view of a detail of construction of the UHF section showing the mounting of elements thereon.

FIG. 4 is a perspective view of the combination UHF-VHF television antenna constructed in accordance with the teachings of the present invention in which the VHF section is the same as the structure shown in FIG. 2. In this connection, like parts are identified by the same reference numerals as applied to FIG. 2. Mounted forward of the boom 122 of the VHF antenna section is a support boom extension 140 upon which are mounted a plurality of in-line, spaced, straight UHF antenna elements referred to generally by the numeral 142. A mast 121 supports both boom 122 and boom extension 140. The top UHF elements 141 and 143 are mounted in a staggered relationship on support 145 while the bottom UHF elements 147 and 149 are also mounted in a staggered relationship on support 151, as seen in FIG. 5. The aforesaid supports 145 and 151 are connected to cross-connectors 101 and 102 respectively. As is clearly illustrated, the down lead 144 is taken from the front of the UHF antenna section.

FIG. 5 illustrates the UHF antenna section shown in FIGURE 4 in greater detail. The staggered elements 141, 143 and 147, 149 are clearly seen together with connecting extensions 153 and 155, the latter being directly connected to cross-connectors 101 and 102. It should be noted that connecting extensions 153 and 155 are displaced vertically with extension 153 mounted in a plane above the extension 155. FIG. 6 shows the mounting of elements 141 and 143 on support 145 of the UHF antenna.

The UHF section of the present television antenna has the following dimensions:

| | Inches |
|---|---|
| Distance between adjacent elements | 1½ |
| Distance between the pair of elements closest to lead-in wires | 3 |
| Distance between the pair of elements next rearward to the above | 3¼ |
| Distance between the pair of elements next rearward to the above | 3½ |
| Distance between the pair of elements next rearward to the above | 4 |
| Distance between the pair of elements next rearward to the above | 4½ |
| Distance between the pair of elements next rearward to the above | 5 |
| Distance between the pair of elements next rearward to the above | 5½ |

FIG. 7 shows an alternative embodiment encompassing the principles of the present invention in which the VHF section of the antenna constitutes three pairs of cross-connected conductors 160, 162 and 164, 166 and 168, 170, each having a parasitic director element, the parasitic elements 172 and 174 being mounted at a lower plane but in front of the respective adjacent conductors and the parasitic element 176 mounted directly underneath its respective conductors. Mounted forward and connected to the VHF section is a UHF unit of the construction set forth in detail hereinbefore in connection with FIG. 5.

What I claim is:

1. A staggered tuned, cross connected, broad band antenna for television comprising a plurality of paired, substantially horizontal in-line conductors of increasing length from front to rear having three groups of parasitic elements to increase the directivity and response on the high VHF TV band including a first group of at least two straight parasitic elements each in front of each of the respective frontmost two in-line pair of conductors, a second group of two straight parasitic elements each mounted below the plane of their respective adjacent in-line cross connected conductor, and a third group of parasitic elements, each being V-shaped having the apex thereof in the plane of the respective adjacent in-line cross connected conductor and each of the legs thereof extending at a downward angle of from 12° to 30° relative to said horizontal conductor and out of the plane of said conductor to increase the capture area of the antenna when operative at the high VHF TV band.

2. A staggered tuned, cross connected, broad band antenna for television as claimed in claim 1 wherein each of said legs is approximately 15 inches in length.

3. A staggered tuned, cross connected, broad band antenna for television as claimed in claim 1 further comprising a UHF television antenna section mounted and connected forward of said broad band antenna.

4. A staggered tuned, cross connected, broad band antenna for television as claimed in claim 3 wherein said UHF television antenna section is constituted of two vertically-spaced supporting conductors, a plurality of horizontally disposed conductors on each of said supporting conductors extending alternately in opposite directions, the length of said horizontally disposed conductors diminishing towards the front of said antenna, the rear of said supporting conductors being connected to the front of said broad band antenna, and a lead in wire connected to the front of said UHF television antenna section.

References Cited

UNITED STATES PATENTS

| | | | |
|---|---|---|---|
| Re. 25,604 | 6/1964 | Greenberg | 343—811 X |
| 2,192,532 | 3/1940 | Katzin | 343—811 |
| 2,534,592 | 12/1950 | Goumas | 343—815 X |
| 2,617,935 | 11/1952 | Best | 343—809 |
| 3,007,167 | 10/1961 | Winegard | 343—815 X |
| 3,150,376 | 9/1964 | Carrel et al. | 343—792.5 |
| 3,259,904 | 7/1966 | Blonder et al. | 343—792.5 |
| 3,217,764 | 5/1967 | Winegard et al. | 343—819 X |

FOREIGN PATENTS

| | | |
|---|---|---|
| 761,056 | 11/1956 | Great Britain. |
| 975,482 | 11/1964 | Great Britain. |

OTHER REFERENCES

Jasik, "Antenna Eng. Handbook," McGraw-Hill, 1961, pp. 2–15.

Kraus, "Antennas," McGraw-Hill, 1950, Chapt. 3, "The Antenna as an Aperture," pp. 50–54.

"Very High Frequency Techniques"; McGraw-Hill, 1947, vol. I, pp. 2–3.

ELI LIEBERMAN, Primary Examiner

W. H. PUNTER, Assistant Examiner

U.S. Cl. X.R.

343—819